US011036074B2

(12) United States Patent
Li et al.

(10) Patent No.: US 11,036,074 B2
(45) Date of Patent: Jun. 15, 2021

(54) COLOR FILM SUBSTRATE, MANUFACTURING METHOD THEREOF, DISPLAY PANEL AND DISPLAY DEVICE

(71) Applicant: BOE TECHNOLOGY GROUP CO., LTD., Beijing (CN)

(72) Inventors: Hui Li, Beijing (CN); Xinyin Wu, Beijing (CN); Yong Qiao, Beijing (CN); Yongda Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/486,111

(22) PCT Filed: Dec. 21, 2018

(86) PCT No.: PCT/CN2018/122846
§ 371 (c)(1),
(2) Date: Aug. 14, 2019

(87) PCT Pub. No.: WO2019/153910
PCT Pub. Date: Aug. 15, 2019

(65) Prior Publication Data
US 2020/0026122 A1 Jan. 23, 2020

(30) Foreign Application Priority Data
Feb. 12, 2018 (CN) .......................... 201820254565.6

(51) Int. Cl.
*G02F 1/1335* (2006.01)
(52) U.S. Cl.
CPC .. *G02F 1/133512* (2013.01); *G02F 1/133516* (2013.01)

(58) Field of Classification Search
CPC ..................... G02F 1/133512; G02F 1/133516
(Continued)

(56) References Cited

U.S. PATENT DOCUMENTS

| 6,450,635 B1 | 9/2002 | Okabe et al. |
| 6,554,420 B2 | 4/2003 | Okabe et al. |

(Continued)

FOREIGN PATENT DOCUMENTS

| CN | 103698931 A | 4/2014 |
| CN | 103792720 A | 5/2014 |

(Continued)

OTHER PUBLICATIONS

International Search Report and Written Opinion dated Mar. 26, 2019, from application No. PCT/CN2018/122846.
(Continued)

*Primary Examiner* — Nathanael R Briggs
*Assistant Examiner* — William D Peterson
(74) *Attorney, Agent, or Firm* — Arch & Lake LLP

(57) ABSTRACT

A color film substrate having a plurality of pixel areas includes a base substrate, a color resistance, a black matrix and protruding structures. The color resistance layer is arranged on the base substrate and including a plurality of color resistances arranged in an array. The black matrix is arranged between any adjacent color resistances. The protruding structure is arranged on at least a portion of the black matrix and surrounding at least one of the color resistances. Wherein a surface of the protruding structure away from the base substrate does not exceed a surface of the color resistance away from the base substrate.

19 Claims, 5 Drawing Sheets

(58) Field of Classification Search
USPC ............................................ 349/106
See application file for complete search history.

(56) References Cited

U.S. PATENT DOCUMENTS

| | | | |
|---|---|---|---|
| 6,848,782 | B2 | 2/2005 | Okabe et al. |
| 9,568,765 | B2 | 2/2017 | Xie |
| 2002/0126194 | A1 | 9/2002 | Okabe et al. |
| 2003/0164871 | A1 | 9/2003 | Okabe et al. |
| 2005/0134639 | A1* | 6/2005 | Okabe .................. G03F 7/0757 347/41 |
| 2015/0338702 | A1* | 11/2015 | Xie .................. G02F 1/133512 349/106 |

FOREIGN PATENT DOCUMENTS

| | | |
|---|---|---|
| CN | 104280805 A | 1/2015 |
| CN | 107505758 A | 12/2017 |
| CN | 105074552 B | 1/2018 |
| CN | 207817366 U | 9/2018 |
| EP | 1 008 873 A1 | 6/2000 |
| EP | 1 008 873 B1 | 6/2000 |
| EP | 1 008 873 B1 | 4/2005 |
| EP | 1 521 106 A1 | 4/2005 |
| EP | 1 521 106 B1 | 4/2005 |
| EP | 1 521 106 B1 | 3/2011 |
| KR | 20070039628 A | 4/2007 |
| KR | 100846959 B1 | 7/2008 |

OTHER PUBLICATIONS

First Office Action issued in Indian Application No. 201927045620 dated Feb. 25, 2021 with English translation, (6p).

* cited by examiner

COLOR FILM SUBSTRATE, MANUFACTURING METHOD THEREOF, DISPLAY PANEL AND DISPLAY DEVICE

CROSS REFERENCE

This disclosure is based on International Application No. PCT/CN2018/122846, filed on Dec. 21, 2018, which is based on and claims priority to Chinese Patent Application (No. 201820254565.6), titled color film substrate, manufacturing method thereof, display panel and display device, filed on Feb. 12, 2018, the entire contents thereof are incorporated herein by reference.

TECHNICAL FIELD

The present disclosure relates to a display technical field, in particular to a color film substrate, a display panel and a display device.

BACKGROUND

A thin film transistor liquid crystal display (referred as TFT-LCD) includes a display panel and a backlight. The display panel generally includes an array substrate, a color film substrate and a liquid crystal layer positioned between the array substrate and the color film substrate.

As the color film substrate is manufactured, a black matrix is usually made on a base substrate, and then a color resistance layer including a red color resistance, a green color resistance, and a blue color resistance is formed on the base substrate with the black matrix through a patterning process.

At present, the adjacent red color resistance, green color resistance and blue color resistance overlap with each other. Compared with the other areas, the overlapping areas have obvious protruding structure, resulting in uneven thickness of the display panel. Generally, a planarization layer is made on the color resistance layer to solve the problem of the uneven thickness. However, the overlapping area is located in the non-display area between the adjacent sub-pixels, in which the color resistance layer does not contribute to the liquid crystal display, instead, additional materials and processes are added to eliminate influence on the thickness. In addition, fabrication of the planarization layer results in that redundancy of the liquid crystal cannot be easily controlled, to easily bring about undesirable phenomena such as mura brightness and low-temperature bubbles.

SUMMARY

A color film substrate with a plurality of pixel areas includes a base substrate, a color resistance layer, a black matrix and protrusions. The color resistance layer is arranged on the base substrate and including a plurality of color resistances arranged in an array. The black matrix is arranged between any adjacent color resistances. The protruding structure is arranged on at least a portion of the black matrix and surrounding at least one of the color resistances. A surface of the protruding structure away from the base substrate does not exceed a surface of the color resistance away from the base substrate, and the color resistance is adjacent to the protruding structure.

According to one arrangement of the present disclosure, the plurality of color resistances includes a red color resistance, a green color resistance and a blue color resistance. The protruding structure is disposed on the black matrix between two color resistances in the same color; and the protruding structure is not disposed on the black matrix between two color resistances in different colors.

According to one arrangement of the present disclosure, the protruding structure includes one or more of rectangular, circular and oval cross sections.

According to one arrangement of the present disclosure, a width $d1$ of the protruding structure satisfies $0 \leq d1 \leq \frac{2}{3}d2$. $d2$ is a maximum distance between the two color resistances adjacent to each other. The protruding structure is centrally disposed on the black matrix.

According to one arrangement of the present disclosure, the protruding structure includes a plurality of protrusions arranged at a distance.

According to one arrangement of the present disclosure, distances between adjacent two protrusions among the plurality of protrusions are completely or partially equal to one another.

According to one arrangement of the present disclosure, the color resistances is rectangular and has two short sides and two long sides. The protruding structures close to one short side is a first protruding structure, and the protruding structures close to the other short side and the two long sides is a second protruding structure. A shape of the first protruding structure is different from a shape of the second protruding structure.

According to one arrangement of the present disclosure, a thickness of the first protruding structure is not less than a thickness of the second protruding structure.

According to one arrangement of the present disclosure, the first protruding structure includes a plurality of protrusions, and the plurality of protrusions of the first protruding structure includes two shapes of a rectangular, circular and oval shapes. The second protruding structure includes a plurality of protrusions, and the plurality of protrusions of the second protruding structure are in the rectangular shape.

According to one arrangement of the present disclosure, the first protruding structure includes a plurality of protrusions, the plurality of protrusions of the first protruding structure have different thickness from one another.

According to the second aspect of the present disclosure, a display panel includes an array substrate having a plurality of pixel areas, a color film substrate and a liquid crystal layer positioned between the array substrate and the color film substrate. The color film substrate is the color film substrate as above described. The plurality of color resistances face to the plurality of pixel areas one by one.

According to one arrangement of the present disclosure, the color resistances in the color film substrate are rectangular and have one short side, and the short side of the color resistance corresponds to a position where a switching transistor of the display panel is located.

According to the third aspect of the present disclosure, a display device includes the display panel as above mentioned.

According to the fourth aspect of the present disclosure, a method for manufacturing a color film substrate includes providing a base substrate. The method includes arranging a color resistance layer on the base substrate. The color resistance layer includes a plurality of color resistances arranged in an array. The method includes arranging a black matrix between any adjacent color resistances. The method includes arranging a protruding structure on at least a portion of the black matrix. A surface of the protruding structure away from the base substrate does not exceed a surface of the color resistance away from the base substrate. The color resistance is adjacent to the protruding structure.

DETAILED DESCRIPTION

Now, the exemplary arrangements will be described more fully with reference to the accompanying drawings. However, the exemplary arrangements can be implemented in various forms and should not be construed as limiting the arrangements as set forth herein. The relativity words, such as "upper" or "lower", as used herein, are directed to describe the relative relationship of the referenced component to another component. These words are used herein for convenience only, for example, according to the direction of the illustrative examples as shown in the figures. It should be appreciated that if the referenced device is inversed upside down, the component indicated as being the "upper" side would become the component on the "lower" side. The other comparative words, such as "top" and "bottom" have the similar meanings. When one structure is "on" another structure, it is possible to indicate that the one structure is integrally formed on the other structure, or the one structure is "directly" arranged on the other structure, or one structure is "indirectly" formed on the other structure by means of a further structure.

The terms "a", "an", "the", "said" and "at least one", when describing element/constituent/or the like as described and/or shown herein, are used to express the presence of one or more the element/constitute/or the like. The terms "include", "comprise" and "have", as used herein, are intended to be inclusive, and mean there may be additional elements/constituents/or the like other than the listed elements/constituents/or the like. In addition, the words "first", "second", or the like, as used in claims, are meant to indication, but not to limit the object to which they modify.

The present disclosure hereinafter will be described in detail with reference to the accompanying drawings.

A TFT-LCD includes a liquid crystal display panel (hereinafter referred to as display panel) and a backlight. The liquid crystal panel consists of an array substrate, a color film substrate and a liquid crystal layer positioned between the array substrate and the color film substrate.

Figure 1:
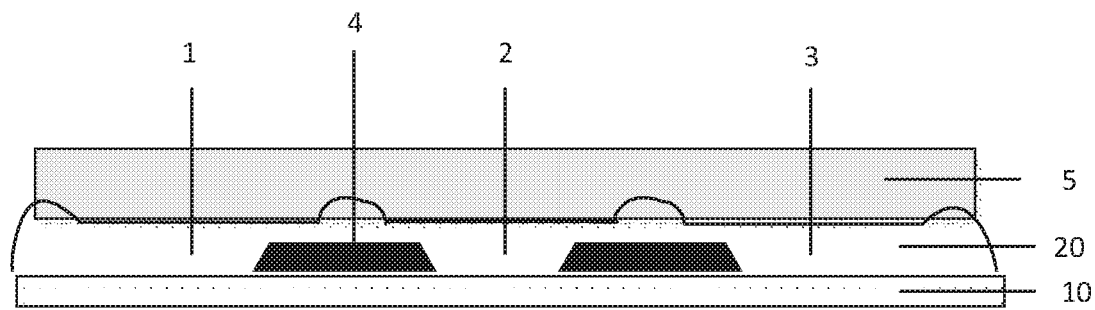
FIG. 1 is a schematic cross-sectional structural view of a color film substrate in the prior art.

FIG. 1 is a schematic cross-sectional structural view of a color film substrate as well known by public. The color film substrate is manufactured generally by making a light shielding layer, for example, a black matrix 4, to prevent reflection or light leakage on the base substrate 10, and then forming a color resistance layer including a red color resistance 1, a green color resistance 2, and a blue color resistance 3 on the base substrate 10 with the black matrix 4 through a patterning process. At present, the corresponding color resistances in the non-display areas between the adjacent sub-pixels are designed to be overlapped with each other. In order to achieve uniform thickness through planarization, the planarization layer 5 is generally adopted, to solve the problem of uneven thickness of the display panel caused by overlapping edges of traditional color resistances.

However, overlapping of the edges of the color resistances does not contribute to the liquid crystal display, and such additional materials and processes for manufacturing the planarization layer 5 need to be added. Although the color film substrate manufactured in this way can solve the problem of uneven thickness, it is difficult to control redundancy of liquid crystal, which easily causes poor display due to too much or too little liquid crystal and easily causes an undesirable phenomena such as mura brightness and low-temperature bubbles.

In order to solve the above problems, one arrangement of the present disclosure provides a color film substrate. The color film substrate includes a color resistance layer arranged on the base substrate and a plurality of color resistances arranged in an array. In some arrangement, the plurality of the color resistances correspond to the plurality of pixel areas of an array substrate of a display panel one by one. In another arrangement, each of the color resistances may have one long side, and the two adjacent color resistances do not overlap at least on the long side. The color film substrate includes a black matrix arranged between any adjacent color resistances. The color film substrate includes a protruding structure arranged on at least a portion of the black matrix and surrounding at least one of the color resistances. A surface of the protruding structure away from the base substrate does not exceed a surface of the color resistance away from the base substrate. The color resistance is adjacent to the protruding structure.

The color film substrate of the present disclosure is employed, on the one hand, one or more protruding structure are arranged on the black matrix, to maintain uniformity of the thickness, on the other hand, the horizontal plane of the protruding structure 6 is not higher than the horizontal plane of the adjacent color resistances, to enhance redundancy of liquid crystals, so that the finished product yield of the display panel can be ensured.

Hereinafter, the color film substrate provided by the present disclosure will be described in detail with reference to the accompanying drawings.

Figure 2:
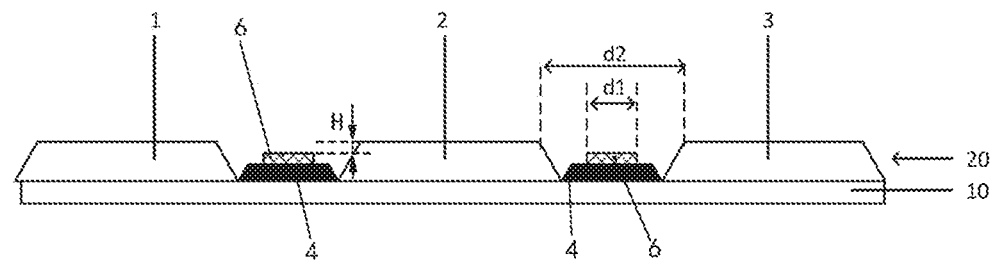
FIG. 2 is a cross-sectional view of the color film substrate provided by one arrangement of the present disclosure.
Figure 3:
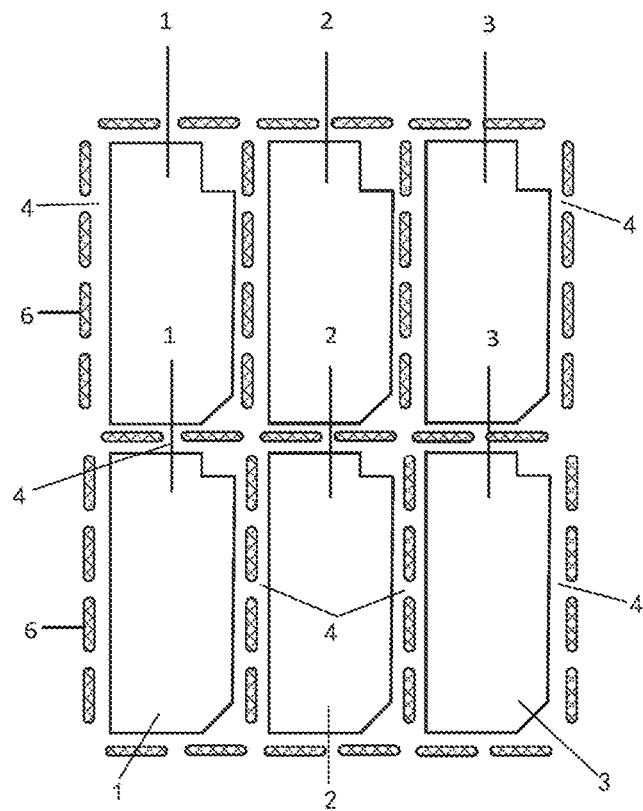
FIG. 3 is a top view of FIG. 2.

Referring to FIG. 2 and FIG. 3, FIG. 2 is a cross-sectional view of the color film substrate provided by one arrangement of the present disclosure, and FIG. 3 is a top view of FIG. 2. As shown in FIG. 2 and FIG. 3, the color film substrate of this arrangement includes a base substrate 10, a color resistance layer 20, a black matrix 4, and a protruding structure 6.

The substrate 10 may be made from glass materials or transparent materials such as polymethyl methacrylate (referred as PMMA), which will not be limited in this arrangement of the present disclosure. The color resistances may be made of resin materials. The blue color resistance is made of blue resin materials, the red color resistance is made of red resin materials, and the green color resistance is made of green resin materials.

The color resistance layer 20 is arranged on the base substrate 10 and includes a plurality of color resistances arranged in an array, for example, the red color resistance 1, the green color resistance 2, and the blue color resistance 3.

A plurality of color resistances correspond to a plurality of pixel areas of the color film substrate respectively, that is, the plurality of color resistances directly face the plurality of pixel areas, respectively.

The shape of each color resistances may be set as desired and may be various. As shown in FIG. 3, the color resistances is a rectangle with cut corners and notches, and each color resistances has at least one long side. The color resistances as shown in FIG. 3 has two long sides and two short sides, and the adjacent long sides of the adjacent two color resistances do not overlap but have a space therebetween. In the arrangement of FIG. 3, the short sides of two adjacent color resistances do not overlap either. The adjacent color resistances including those in the same color and those in different colors, may not overlap on the four sides, or may overlap on the short sides but not overlap at least on the long sides.

The black matrix 4 is arranged between any adjacent color resistances.

One or more protruding structure 6 are provided on at least a portion of the black matrixes 4 between the pixel areas located in a row and/or column. In the arrangement of FIG. 3, all black matrixes 4 are provided with protruding structure 6 between the color resistances in the same color and between the color resistances in different colors. In some other arrangements, the protruding structure 6 may be merely provided in a portion of black matrixes 4 but not provided on the other black matrixes 4.

The surface of the protruding structure 6 distanced from the base substrate 10 does not exceed the surface of the color resistances distanced from the based substrate 10. The color resistance is adjacent to the protruding structure 6. As shown in FIG. 2, there is a height difference H between the plane on the top of the protruding structure 6 and the plane on the top of the red color resistance 1 or the green color resistance 2 adjacent to the protruding structure 6, that is, the plane on the top of the protruding structure 6 is lower than the plane on the top of the red color resistance 1 or the green color resistance 2.

As shown in FIG. 2, the cross section of each color resistances is trapezoidal, and a distance between two adjacent color resistances varies between the minimum distance and the maximum distance. As shown in FIG. 2, the maximum distance between the green color resistance 2 and the blue color resistance 3 adjacent to each other is d2, and the width d1 of the protruding structure 6 is satisfied for a range of $0<d1\leq\frac{2}{3}d2$, preferably $0<d1\leq\frac{1}{3}d2$. The protruding structure 6 may be centrally disposed on black matrix 4, and in other arrangements, the protruding structure 6 may be offset from the center position.

In this implementation, the black matrix 4 is provided with the protruding structure 6, and the distances between the protruding structure 6 are equal, so that the redundancy of liquid crystal is enhanced and poor display caused due to too much or too little liquid crystal in the liquid crystal box may be effectively avoid. The protruding structure 6 spaced at a certain distance may reduce affection between adjacent layers, reduce the influence on the display effect caused by disturbance of the liquid crystal between different pixels, and achieve an object of improving the liquid crystal display effect and the finished product yield rate.

Figure 4:
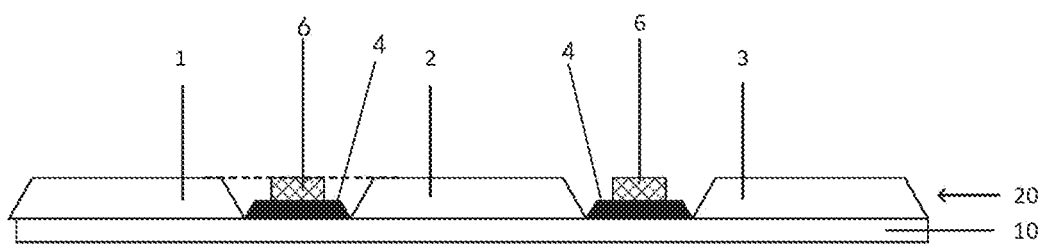
FIG. 4 is a cross-sectional view of the color film substrate provided by another arrangement of the present disclosure.
Figure 5:
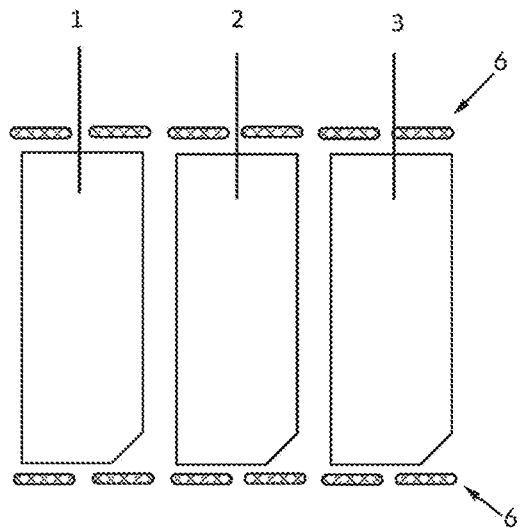
FIG. 5 is a top view of FIG. 4.

Referring to FIG. 4 and FIG. 5, FIG. 4 is a cross-sectional view of a color film substrate provided by another arrangement of the present disclosure, and FIG. 5 is a top view of FIG. 4. As shown in FIG. 4 and FIG. 5, the color film substrate of this arrangement includes a base substrate 10, a color resistance layer 20, a black matrix 4, and protruding structure 6, which is different from that in the arrangement as shown in FIG. 2 in that:

Each of the color resistances has a rectangular shape lacking a corner.

The protruding structure 6 are not arranged between the color resistances in different colors, but may be arranged between the color resistances in the same color. For example, there is no protruding structure 6 arranged between red color resistance 1 and the green color resistance 2, or between the green color resistance 2 and the blue color resistance 3, whereas there is protruding structure 6 respectively arranged between the red color resistances 1, or between the green color resistances 2, or between the blue color resistances 3.

Other structures of the arrangements of the color film substrate as shown in FIG. 4 are substantially the same as those of the arrangements of the color film substrate as shown in FIG. 2, which will be omitted here.

In the present disclosure, the protruding structure 6 on each black matrix 4 may be an integral structure or may also be composed of a plurality of protrusions spaced apart from one another. The protrusions may be cylindrical, prismatic or the like, that is, the cross-sectional shape of the protrusions may be rectangular or other polygonal, circular or elliptical, and the protruding structure 6 may include protrusions in one shape or a combination of protrusions in various shapes. The distances between the two adjacent protrusions among the plurality of protrusions are completely or partially equal to one another.

Figure 6:
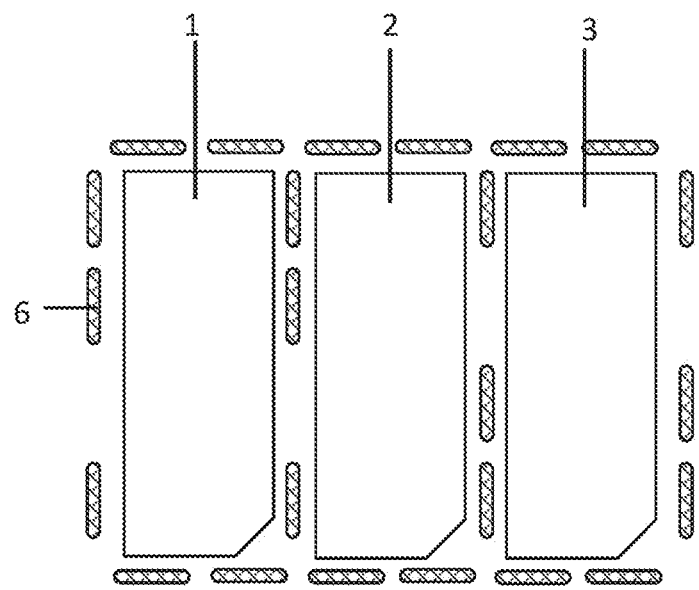
FIG. 6 is a top view of the color film substrate provided by another arrangement of the present disclosure.

As shown in FIG. 3 and FIG. 5, the protruding structure 6 include a plurality of rectangular protrusions arranged at an equal distance. As shown in FIG. 6, the protruding structure 6 include a plurality of rectangular protrusions with different distance from one another.

Figure 7:
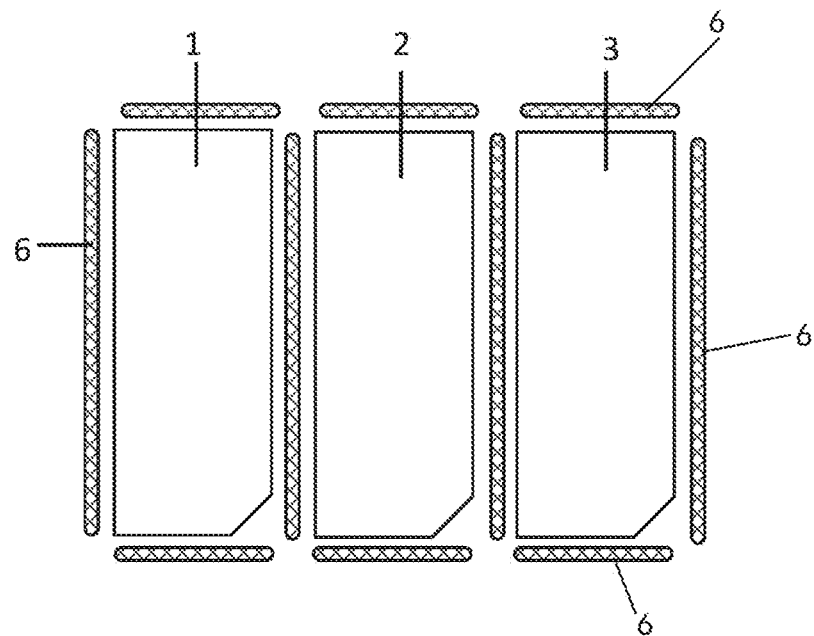
FIG. 7 is a top view of the color film substrate provided by a further arrangement of the present disclosure.

As shown in FIG. 7, the protruding structure 6 are of an integral rectangular shape, on the one hand, it may create a better adhesion force between the protruding structure 6 and the base substrate 10, and improve the product performance; on the other hand, there is a gap between protruding structure 6 and the adjacent color resistances, and the top plane of the protruding structure 6 is not higher than the top plane of the adjacent color resistances, so that the redundancy of the liquid crystal can be enhanced, and the finished product yield of the display panel can be ensured.

Figure 8:
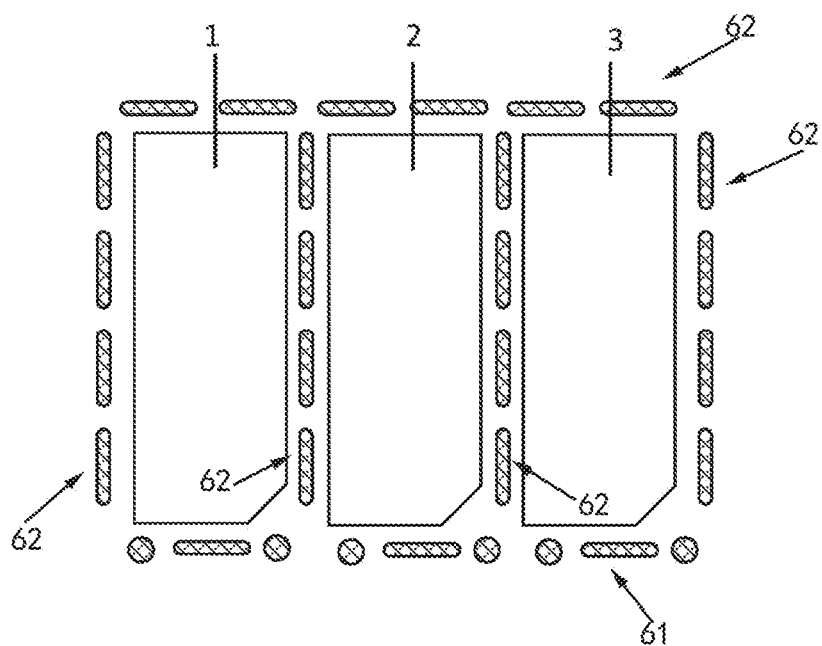
FIG. 8 is a top view of the color film substrate provided by a further arrangement of the present disclosure.
Figure 9:
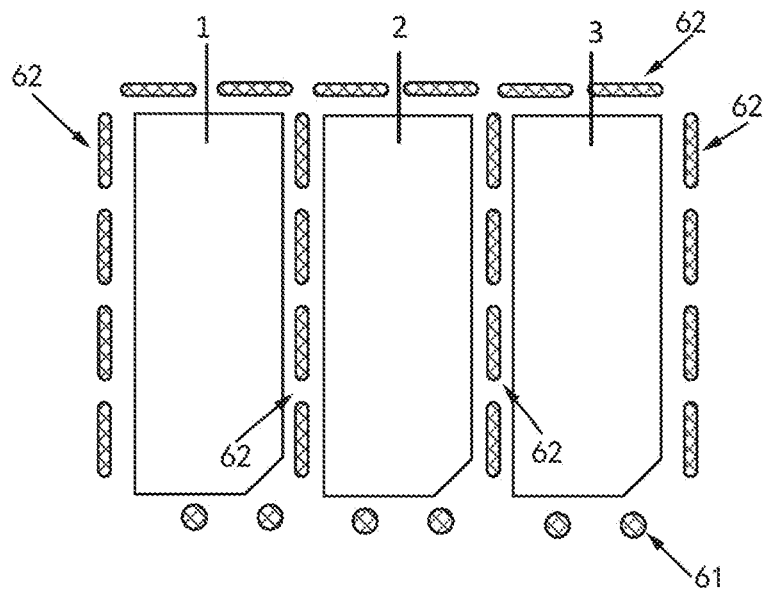
FIG. 9 is a top view of the color film substrate provided by a yet arrangement of the present disclosure.

As shown in FIG. 8, one part of the protruding structure 6 include a plurality of rectangular protrusions arranged at equal distances, and the other part of the protruding structure 6 include a combination of the rectangular protrusions and the circular protrusions. As shown in FIG. 9, one part of the protruding structure 6 includes a plurality of rectangular protrusions arranged at equal distances, and the other part of the protruding structure 6 include a combination of a plurality of circular protrusions.

As shown in FIG. 8 and FIG. 9, the color resistances have a shape similar to a rectangle, having two long sides and two short sides. The protruding structure 6 are arranged on the circumference of each color resistances. The protruding structure 6 close to one of the short sides is the first protruding structure 61. The protruding structure 6 closed to the other short side and two long sides is the second protruding structure 62. The shape of the first protruding structure 61 is different from the shape of the second protruding structure 62. As shown in FIG. 8, the first protruding structure 61 include a plurality of rectangular protrusions and a plurality of circular protrusions, which are spaced apart from each other, and the two circular protrusions are arranged between the two rectangular protrusions. The second protruding structure 62 includes a plurality of rectangular protrusions arranged at equal distances. As shown in FIG. 9, the first protruding structure 61 include a plurality of circular protrusions spaced apart from each other, and the distances between the two adjacent protrusions are equal to one another or not. The second protruding structure 62 includes a plurality of rectangular protrusions arranged at equal distances.

In this arrangement, the thickness of the first protruding structure 61 is not less than the thickness of the second protruding structure 62. The thickness refers to the distance between the surface of the protrusion in contact with the black matrix and the surface of the protrusion away from the black matrix. The thickness of the plurality of protrusions of the first protruding structure 61 is different. Of course, in other arrangements, the thickness of the plurality of protrusions of the first protruding structure 61 may be equal to one another. The thickness of the first protruding structure 61 may be less than the thickness of the second protruding structure 62.

Figure 10:
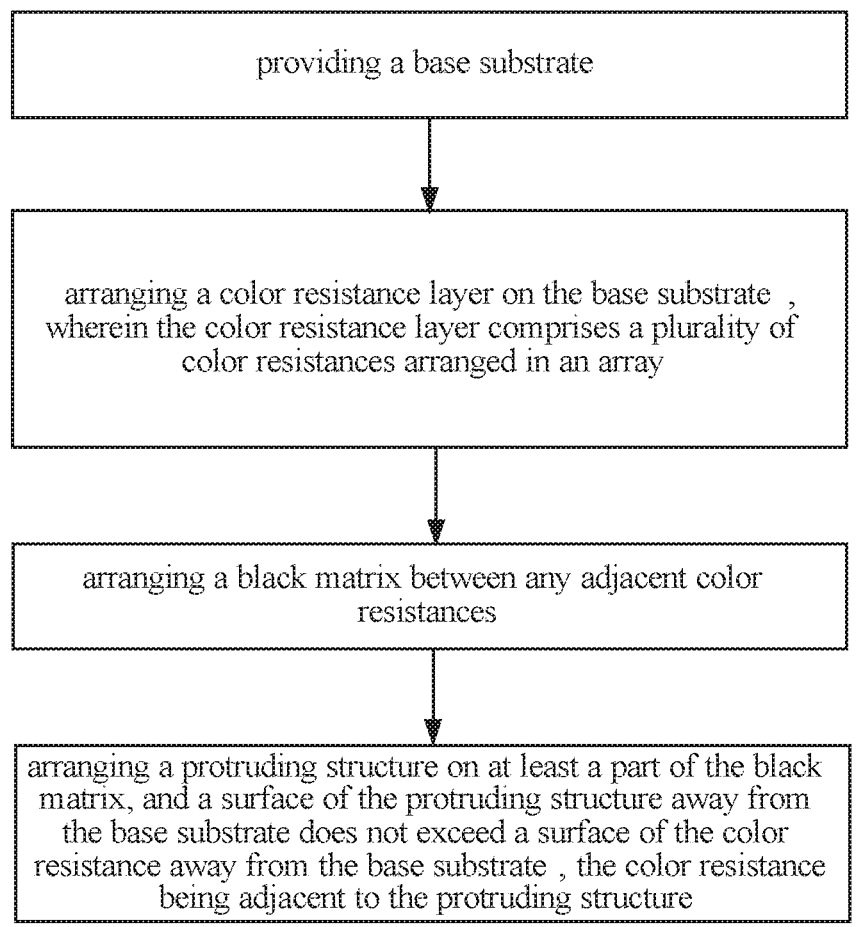
FIG. 10 is a flowchart of a method for fabricating a color filter substrate according to an arrangement of the present disclosure.

As shown in FIG. 10, FIG. 10 is a flowchart of a method for fabricating a color filter substrate according to an arrangement of the present disclosure. The present disclosure provides a method for manufacturing a color film substrate including the following blocks.

Block S101: providing a base substrate 10;

Block S102: arranging a color resistance layer on the base substrate 10. The color resistance layer includes a plurality of color resistances arranged in an array;

Block S103: arranging a black matrix 4 between any adjacent color resistances; and Block S104: arranging a protruding structure 6 on at least one portion of the black matrix 4, and the surface of the protruding structure 6 away from the base substrate 10 does not exceed the surface of the color resistances away from the base substrate 10. The color resistance is adjacent to the protruding structure 6.

To sum up, the color film substrate provided by the arrangement of the disclosure, through the color film design of the protruding structure separated from the color resistances, can enhance the redundancy of liquid crystal and effectively avoid poor display caused by too much or too little liquid crystal in the liquid crystal box; and the protruding structure distanced from each other may reduce affection between the adjacent layers, reduce the influence on the display effect due to disturbance of the liquid crystal between different pixels, and achieve the object of improving the liquid crystal display effect and improving the product yield rate.

An arrangement of the present disclosure provides a display panel, which includes an array substrate having a plurality of pixel areas, a color film substrate and a liquid crystal layer positioned between the array substrate and the color film substrate. The color film substrate is one as described in this disclosure. The plurality of color resistances face to the plurality of pixel areas one by one.

Referring to FIG. 8 and FIG. 9, a plurality of color resistances in the color film substrate correspond to a plurality of pixel areas. The color resistances in the color film substrate are rectangular. The first protruding structure 61 is adjacent to one short side of the color resistances. The first protruding structure 61 and the short side of the color resistances correspond to the position where a switching transistor of the display panel is located, that is, the first protruding structure 61 and the short side of the color resistances directly face the position where the switching transistor of the display panel is located, after the array substrate and the color film substrate are configured opposite to each other to form a cell.

In the specific implementation, the display provided by the arrangement of the present disclosure may be any product or component with display function, such as a mobile phone, a tablet computer, a television, a display, a notebook computer, a digital photo frame, and a navigator, etc.

It should be understood that this disclosure would never be limited to the detailed construction and arrangement of components as set forth in this specification. This disclosure has other arrangements that can be practiced or carried out in various ways. The foregoing variations and modifications fall within the scope of this disclosure. It should be understood that this disclosure would contain all alternative combination of two or more individual features as mentioned or distinct from in the text and/or in the drawings. All of these different combinations constitute a number of alternative aspects of this disclosure. The arrangements as illustrated in this specification are the best modes known to achieve this disclosure and will enable one skilled in the art to realize this disclosure.

What is claimed is:

1. A color film substrate, comprising:
   a base substrate;
   a color resistance layer arranged on the base substrate, the color resistance layer comprising a plurality of color resistances arranged in an array;
   a black matrix arranged between adjacent ones of the color resistances;
   a protruding structure arranged on at least a portion of the black matrix and surrounding at least one of the color resistances;
   wherein a surface of the protruding structure away from the base substrate does not exceed a surface of the color resistance away from the base substrate, the color resistance adjacent to the protruding structure, wherein the plurality of color resistances comprise a red color resistance, a green color resistance and a blue color resistance; the protruding structure is disposed on the black matrix between two of the color resistances in the same color; and the protruding structure is not disposed on the black matrix between of the two color resistances in different colors.

2. The color film substrate according to claim 1, wherein the protruding structure comprises one or more of rectangular, circular or oval cross sections.

3. The color film substrate according to claim 1, wherein a width d1 of the protruding structure satisfies 0≤d1≤⅔d2, wherein d2 is a maximum distance between the two color resistances adjacent to each other, and the protruding structure is centrally disposed on the black matrix.

4. The color film substrate according to claim 1, wherein the protruding structure comprises a plurality of protrusions spaced apart from one another by a distance.

5. The color film substrate according to claim 4, wherein distances between adjacent two protrusions among the plurality of protrusions are completely or partially equal to one another.

6. The color film substrate according to claim 4, wherein each of the color resistances is rectangular and has two short sides and two long sides; a first protruding structure is close to one short side, and a second protruding structure is close to the other short side and the two long sides; and wherein a shape of the first protruding structure is different from a shape of the second protruding structure.

7. The color film substrate according to claim 6, wherein a thickness of the first protruding structure is not less than a thickness of the second protruding structure.

8. The color film substrate according to claim 6, wherein the first protruding structure comprises a plurality of protrusions, and the plurality of protrusions of the first protruding structure comprise two of a rectangular shape, circular shape and oval shape; the second protruding structure comprises a plurality of protrusions, and the plurality of protrusions of the second protruding structure are in the rectangular shape.

9. The color film substrate according to claim 6, wherein the first protruding structure comprises a plurality of protrusions, the plurality of protrusions of the first protruding structure have different thicknesses.

10. A display panel, comprising an array substrate having a plurality of pixel areas, a color film substrate and a liquid crystal layer positioned between the array substrate and the color film substrate, wherein the color film substrate is the color film substrate according to claim 1, the plurality of color resistances face to the plurality of pixel areas one by one.

11. The display panel according to claim 10, wherein the color resistances in the color film substrate are rectangular and have one short side, and the short side of the color resistance corresponds to a position where a switching transistor of the display panel is located.

12. A display device comprising the display panel according to claim 10.

13. A method for manufacturing a color film substrate, comprising:
providing a base substrate;
arranging a color resistance layer on the base substrate, wherein the color resistance layer comprises a plurality of color resistances arranged in an array, wherein the plurality of color resistances comprise a red color resistance, a green color resistance and a blue color resistance; the protruding structure is disposed on the black matrix between two of the color resistances in the same color; and the protruding structure is not disposed on the black matrix between of the two color resistances in different colors;
arranging a black matrix between adjacent ones of the color resistances;
arranging a protruding structure on at least a portion of the black matrix, and a surface of the protruding structure away from the base substrate does not exceed a surface of one of the color resistances away from the base substrate, the color resistance adjacent to the protruding structure.

14. The color film substrate according to claim 1, wherein the protruding structure comprises one or more of rectangular, circular or oval cross sections.

15. The color film substrate according to claim 1, wherein a width d1 of the protruding structure satisfies 0≤d1≤⅔d2, wherein d2 is a maximum distance between the two color resistances adjacent to each other, and the protruding structure is centrally disposed on the black matrix.

16. The color film substrate according to claim 1, wherein the protruding structure comprises a plurality of protrusions spaced apart from one another by a distance.

17. A display panel, comprising an array substrate having a plurality of pixel areas, a color film substrate and a liquid crystal layer positioned between the array substrate and the color film substrate, wherein the color film substrate is the color film substrate according to claim 1, the plurality of color resistances face to the plurality of pixel areas one by one.

18. A display panel, comprising an array substrate having a plurality of pixel areas, a color film substrate and a liquid crystal layer positioned between the array substrate and the color film substrate, wherein the color film substrate is the color film substrate according to claim 2, the plurality of color resistances face to the plurality of pixel areas one by one.

19. A display panel, comprising an array substrate having a plurality of pixel areas, a color film substrate and a liquid crystal layer positioned between the array substrate and the color film substrate, wherein the color film substrate is the color film substrate according to claim 3, the plurality of color resistances face to the plurality of pixel areas one by one.

* * * * *